Patented Dec. 8, 1925.

1,564,410

UNITED STATES PATENT OFFICE.

CARL EYER AND ROBERT GRIESSBACH, OF LUDWIGSHAFEN-ON-THE-RHINE, GERMANY, ASSIGNORS TO BADISCHE ANILIN- & SODA FABRIK, OF LUDWIGSHAFEN-ON-THE-RHINE, GERMANY, A CORPORATION OF GERMANY.

MANUFACTURING SOLID CALCIUM NITRATE.

No Drawing. Application filed June 29, 1925. Serial No. 40,449.

*To all whom it may concern:*

Be it known that we, CARL EYER and ROBERT GRIESSBACH, citizens of the German Empire, residing at Ludwigshafen-on-the-Rhine, Germany, have invented new and useful Improvements in Manufacturing Solid Calcium Nitrate, of which the following is a specification.

Our present invention relates to a process of manufacturing solid calcium nitrate. It is known that hot highly concentrated calcium nitrate solutions solidify slowly and with difficulty by reason of very viscous undercooled products being first formed. Even when solid product is added to initiate crystallization the process of solidification is still too slow for practical purposes.

We have made the surprising and important practical discovery that a solid product can be readily obtained from concentrated calcium nitrate solutions containing a small amount of an ammonium salt. The amount may vary within certain limits but should not, as a rule, exceed about 2 percent calculated as $NH_3$ in the mixture (or about 12 percent of ammonium nitrate) and preferably ranges between about 0.3 and 0.9 percent $NH_3$ (or about 1.7 and 5 percent of ammonium nitrate). The ammonium is added most suitably in the form of nitrate, but sulfate or other ammonium salts may also be added, or compounds, such as urea, which are converted into ammonium compounds by the action of hot concentrated calcium nitrate.

Calcium nitrate solutions of the character described excel owing to their property of freezing rapidly at comparatively high temperatures, and solidification may accordingly be carried out in any known or suitable manner. The liquid mass may be stirred in a cooling pan until solid, or it may be brought, in a thin layer, onto a cooled revolving drum and solidification takes place even rapidly enough to employ spraying of the solution in, or with the aid, of a current of air or other gas.

The stability of the product is not unfavorably influenced by the said additions while on the other hand the product has the advantage of an increased nitrogen content.

For example, a calcium nitrate solution evaporated to a strength of about 70 degrees Baumé is mixed with about 5 percent its weight of ammonium nitrate whereupon the mixture is cooled while stirring. Freezing begins at as high as about 70 degrees centigrade, when the mass first grows crumbly and then fully solidifies on further cooling. An addition of particles of solid mass may be of some assistance, but generally it is not necessary. Pure calcium nitrate solution, free from ammonium salt, would begin to solidify at as low as 30 degrees centigrade only, under similar conditions. Again when such solution is sprayed by means of compressed air the drops of the spray will fall down in a liquid state, while with an addition of about 2 or 3 per cent of ammonium nitrate to the hot solution of 70 degrees Baumé, a solid product in the form of globular little grains like solidified drops or spray of liquid suitable for spreading is at once obtained.

Or, a calcium nitrate solution of 1.985 specific gravity is mixed with 5 percent its weight of ammonium chlorid and cooled while stirring. The mass begins to crumble at between about 90 and 95 degrees centigrade and solidifying is soon complete. This mixture may also be solidified by the spraying method.

What we claim is:

1. The process of manufacturing solid calcium nitrate, which consists in cooling a hot concentrated calcium nitrate solution containing a moderate content of ammonium salt.

2. The process of manufacturing solid calcium nitrate, which consists in cooling a hot concentrated calcium nitrate solution containing an amount of ammonium salt equal to less than 10 percent of ammonium nitrate.

3. The process of manufacturing solid calcium nitrate, which consists in spraying, by means of a current of air, a hot concentrated solution of calcium nitrate containing a small amount of ammonium salt.

4. As a new article of manufacture, solid calcium nitrate containing in molecular distribution a small amount of an ammonium salt.

5. As a new article of manufacture, calcium nitrate containing in molecular distribution an amount of ammonium salt equal to less than 10 per cent of ammonium nitrate.

6. As a new article of manufacture, calcium nitrate containing in molecular distribution an amount of ammonium salt equal to less than 10 per cent of ammonium nitrate and having the form of globular little grains like solidified drops of liquid.

In testimony whereof we have hereunto set our hands.

CARL EYER.
ROBERT GRIESSBACH.